United States Patent [19]

Kok-Schram De Jong

[11] Patent Number: 5,130,825
[45] Date of Patent: Jul. 14, 1992

[54] ARRANGEMENT FOR GRAPHIC REPRESENTATION USING HOLOGRAPHIC FOILS

[76] Inventor: Marijke I. Kok-Schram De Jong, Krimweg 3A, NL-7351 AS Hoenderloo, Netherlands

[21] Appl. No.: 223,061

[22] PCT Filed: Nov. 4, 1987

[86] PCT No.: PCT/EP87/00666

§ 371 Date: Jul. 5, 1988

§ 102(e) Date: Jul. 5, 1988

[30] Foreign Application Priority Data

Nov. 5, 1986 [DE] Fed. Rep. of Germany ....... 3637672
Feb. 11, 1987 [DE] Fed. Rep. of Germany ....... 3704137

[51] Int. Cl.[5] ............................ G02B 5/32; G09F 1/12
[52] U.S. Cl. ......................................... 359/15; 359/3; 40/152
[58] Field of Search ..................... 40/152-159, 40/904, 124.1; 430/191, 326; 524/424; 358/76; 350/3.87, 3.6, 3.75, 3.7-3.86, 320, 321; 428/201; 359/1-35

[56] References Cited

U.S. PATENT DOCUMENTS

| | | | |
|---|---|---|---|
| 2,651,129 | 9/1953 | Spertus | 40/152.1 |
| 3,787,992 | 1/1974 | Leonhardt | 40/152 |
| 4,128,324 | 12/1978 | Seeger | 354/112 |
| 4,668,523 | 5/1987 | Begleiter | 350/3.6 |
| 4,717,221 | 1/1988 | McGrew | 350/3.7 |
| 4,834,475 | 5/1989 | Robinson | 350/3.75 |
| 4,921,319 | 5/1990 | Mallik | 350/3.6 |

FOREIGN PATENT DOCUMENTS

| | | |
|---|---|---|
| 54545 | 1/1980 | Australia . |
| 195234 | 9/1986 | European Pat. Off. . |
| 1349217 | 12/1963 | France . |
| 2182383 | 7/1973 | France . |
| 2281845 | 12/1976 | France . |
| 534598 | 3/1941 | United Kingdom . |

OTHER PUBLICATIONS

"Formation of Optical Elements by Holography", Sincerbox, IBM Technical Disclosure, vol. 10, No. 3, Aug. 1967, pp. 267-268.

Magarinos, Jose R. and Coleman, Daniel J., "Holographic Mirrors", Optical Engineering, vol. 24, No. 5 (Sep./Oct. 1985), pp. 769-780.

Primary Examiner—Bruce Y. Arnold
Assistant Examiner—Thong Nguyen

[57] ABSTRACT

An arrangement for graphic representation using holographic foils includes a holographic prism foil. In order to obtain holographic images, a diapositive is held at a distance from the holographic prism foil.

13 Claims, 1 Drawing Sheet

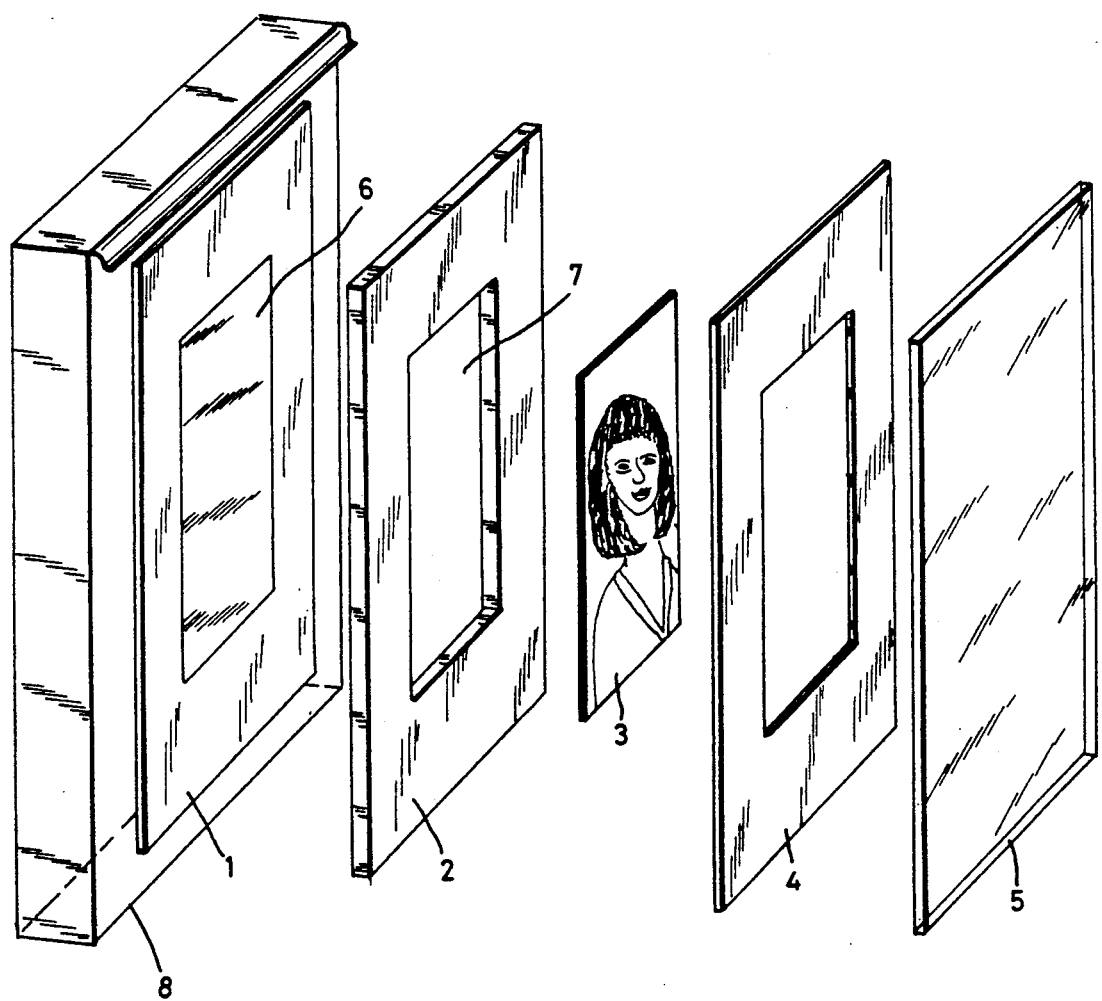

ARRANGEMENT FOR GRAPHIC REPRESENTATION USING HOLOGRAPHIC FOILS

BACKGROUND OF THE INVENTION

The invention relates to an arrangement for graphic representation using holographic foils.

So-called holographic foils, i.e., aluminum foils, which exhibit a certain pattern when operated upon by a laser beam are known in the art. Such foils which, for example, are employed in the art for thermal applications, can also be used for the production of other objects. However, it is difficult to inscribe foils of this type.

SUMMARY OF THE INVENTION

It is an object of the invention to provide a method which makes it possible to inscribe such foils. Another object of the invention is to produce an image having a holographic effect using the characteristics of foils of this type.

The term "diapositive" in this application is always taken to mean a positive image which is arranged on a light-transmitting carrier. This carrier may consist of glass or synthetic resin and the positive image may be produced by photographic means, printing or drawing.

The invention proposes that the holographic foil not be printed but, instead, that a diapositive be placed on the holographic foil. If this diapositive is placed directly on the holographic foil, that is, without a certain spacing between the same, the impression of a printed object, e.g., a visiting card, rather than a three-dimensional image, is obtained.

In contrast to the normal printing inks applied to holographic foils, the symbols made in this manner are resistant to rubbing and cannot be removed.

If a holographic prism foil is used and the diapositive arranged at a spacing from the holographic prism foil, a holographic effect arises in that the image has many colors because the diapositive receives light from the back and becomes transparent. As a result, it is possible for the first time to distinguish the colors of the diapositive. When the areas of an object which appear white in the image are to be accentuated particularly clearly, it is of value to make these areas white in the diapositive, namely, with an opaque paint, preferably a so-called lime paint.

No special light is required with this technique. Normally, an extra light source is necessary for the reproduction of diapositives in order to project the image. However, the holographic foil, such as a laser foil, returns so much light that normal daylight suffices for viewing of the image.

The foil acts like a mirror but only when the object, e.g., the diapositive, is held at a distance of approximately 1 to 5 mm from the foil. The distance depends upon the sharpness of the diapositive. Similarly to a mirror, one sees the image behind the foil and not, as for a reproduction on paper, on the paper.

The arrangement according to the invention makes it possible to achieve surprising effects which have not been recognized by the art until now and not only lead to entirely new technical possibilities but also open up a wide range of artistic possibilities.

BRIEF DESCRIPTION OF THE DRAWING

In order to further explain the subject matter of the invention, the accompanying drawing illustrates an arrangement for the production of an image having a holographic effect.

DESCRIPTION OF THE PREFERRED EMBODIMENTS

In the drawing, 1 identifies a cardboard forming part of a holographic member or support which further comprises a holographic prism foil 6. A carrier 2 here shown as a frame-like element of predetermined thickness (approximately 5 mm) is disposed in front of this cardboard 1 and has an appropriate opening 7 which transmits light and through which the holographic prism foil 6 is visible. An image-bearing transparency 3, preferably a colored diapositive, is arranged on the carrier 2 in front of this opening and is surrounded by a so-called mount 4. The whole is then covered with a transparent sheet in the form of a glass plate 5 held in a frame 8.

In this arrangement according to the invention has the advantage that the diapositive 3 is exposed to light, i.e., illuminated, from the back so that the true colors of the diapositive appear.

In order that the normally white regions of an image, which are to be particularly accentuated, not be dimmed by the impinging light, a coating of absolutely opaque white lime paint is applied to the regions which are to appear white so that these regions receive light only from the front and not from the back.

I claim:

1. A holographic article, comprising a holographic member, said member including a support and a holographic foil disposed on said support; a light-transmitting carrier juxtaposed with said member, said carrier including a frame-like element defining an opening and having a thickness of approximately 5 mm; and a transparency mounted on said carrier and spaced apart from said member, said transparency being disposed on said carrier in front of said opening.

2. The article of claim 1, wherein said transparency compromises a diapositive.

3. The article of claim 2, wherein said diapositive is colored.

4. The article of claim 1, wherein said foil is a prism foil.

5. The article of claim 1, wherein said member is reflective and arranged to reflect light onto said transparency.

6. The article of claim 1, wherein said member is located on one side of said element; and further comprising a transparent sheet which is juxtaposed with said element on the opposite side thereof.

7. The article of claim 6, further comprising a mount between said element and said sheet and surrounding said transparency.

8. The article of claim 7, further comprising a frame which confines said member, said carrier, said transparency, said sheet and said mount.

9. The article of claim 1, wherein said support comprises cardboard.

10. The article of claim 1, further comprising a white coating on portions of said transparency which have a white appearance.

11. The article of claim 10, wherein said coating is opaque.

12. The article of claim 10, wherein said coating comprises white paint.

13. The article of claim 12, wherein said paint is a lime paint.

* * * * *